United States Patent
Kolan et al.

(10) Patent No.: US 11,200,126 B2
(45) Date of Patent: Dec. 14, 2021

(54) UTILIZING TRANSLATION TABLES FOR TESTING PROCESSORS

(71) Applicant: International Business Machines Corporation, Armonk, NY (US)

(72) Inventors: Tom Kolan, Haifa (IL); Hillel Mendelson, Kibbutz Hahotrim (IL); Vitali Sokhin, Haifa (IL); Shay Aviv, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 16/787,145

(22) Filed: Feb. 11, 2020

(65) Prior Publication Data
US 2021/0248050 A1 Aug. 12, 2021

(51) Int. Cl.
*G06F 12/00* (2006.01)
*G06F 11/26* (2006.01)
*G06F 12/1045* (2016.01)
*G06F 11/263* (2006.01)

(52) U.S. Cl.
CPC .......... *G06F 11/261* (2013.01); *G06F 11/263* (2013.01); *G06F 12/00* (2013.01); *G06F 12/1045* (2013.01)

(58) Field of Classification Search
None
See application file for complete search history.

(56) References Cited

U.S. PATENT DOCUMENTS 9,250,937 B1 2/2016 Franz et al.
10,026,500 B2 7/2018 Doron et al.

OTHER PUBLICATIONS

Unveiling Difficult Bugs in Address Translation Caching Arrays for Effective Postsilicon Validation.
Improving Post-Silicon Validation Efficiency by Using Pre-Generated Data.

*Primary Examiner* — Midys Rojas
(74) *Attorney, Agent, or Firm* — Ziv Glazberg

(57) ABSTRACT

A method, apparatus and a product for utilizing translation tables for testing processors. The method is used for testing a target processor that utilizes different translation tables to translate virtual addresses to physical addresses. The method comprises obtaining a test template that comprises directives to be executed in different contexts, during each of which a different translation table is utilized to translate virtual addresses to physical addresses. The translation tables to be used by the target processor in the different contexts are determined, so that the translation tables overlap, at least in part.

20 Claims, 5 Drawing Sheets

UTILIZING TRANSLATION TABLES FOR TESTING PROCESSORS

TECHNICAL FIELD

The present disclosure relates to quality assurance in general, and to verification of operation of processors while utilizing different translation tables, in particular.

BACKGROUND

Computerized devices control almost every aspect of our life—from writing documents to controlling traffic lights. However, computerized devices are bug-prone, and thus require a testing phase in which the bugs should be discovered. The testing phase, also referred to as verification phase, is considered one of the most difficult tasks in designing a computerized device. The cost of a bug may be enormous, as its consequences may be disastrous. For example, a bug may cause the injury of a person relying on the designated functionality of the computerized device. Additionally, a bug in hardware or firmware may be expensive to fix, as patching it requires call-back of the computerized device. Hence, many developers of computerized devices invest a significant portion, such as 70%, of the development cycle to discover erroneous functionalities of the computerized device.

BRIEF SUMMARY

One exemplary embodiment of the disclosed subject matter is a method comprising: obtaining a test template, wherein the test template is utilized for testing a target processor, wherein the test template comprises one or more directives, at least one of which represents a plurality of alternative sets of one or more instructions executable by the target processor, wherein the target processor is configured to utilize a different translation table to translate a virtual address to a physical address in different contexts, wherein the test template comprises: a first set of directives to be executed in a first context; a second set of directives to be executed in a second context; based on the test template, generating a modified test template, wherein said generating comprises: determining a first translation table to be used in the first context by the target processor, wherein the first translation table comprises a mapping of a first set of virtual addresses to a first set of physical addresses, whereby during execution of instructions generated based on the first set of directives, memory address translations are handled using the first translation table; determining a second translation table to be used in the second context by the target processor, wherein the second translation table comprises a mapping of a second set of virtual addresses to a second set of physical addresses, whereby during execution of instructions generated based on the second set of directives, memory address translations are handled using the second translation table, wherein the first translation table and the second translation table overlap.

Another exemplary embodiment of the disclosed subject matter is a computer program product comprising a non-transitory computer readable storage medium retaining program instructions, which program instructions when read by a processor, cause the processor to perform: obtaining a test template, wherein the test template is utilized for testing a target processor, wherein the test template comprises one or more directives, at least one of which represents a plurality of alternative sets of one or more instructions executable by the target processor, wherein the target processor is configured to utilize a different translation table to translate a virtual address to a physical address in different contexts, wherein the test template comprises: a first set of directives to be executed in a first context; a second set of directives to be executed in a second context; based on the test template, generating a modified test template, wherein said generating comprises: determining a first translation table to be used in the first context by the target processor, wherein the first translation table comprises a mapping of a first set of virtual addresses to a first set of physical addresses, whereby during execution of instructions generated based on the first set of directives, memory address translations are handled using the first translation table; determining a second translation table to be used in the second context by the target processor, wherein the second translation table comprises a mapping of a second set of virtual addresses to a second set of physical addresses, whereby during execution of instructions generated based on the second set of directives, memory address translations are handled using the second translation table, wherein the first translation table and the second translation table overlap.

Yet another exemplary embodiment of the disclosed subject matter is a target processor that is adapted to perform the steps of: obtaining a test template, wherein the test template is utilized for testing the target processor, wherein the test template comprises one or more directives, at least one of which represents a plurality of alternative sets of one or more instructions executable by the target processor, wherein the target processor is configured to utilize a different translation table to translate a virtual address to a physical address in different contexts, wherein the test template comprises: a first set of directives to be executed in a first context; a second set of directives to be executed in a second context; based on the test template, generating a modified test template, wherein said generating comprises: determining a first translation table to be used in the first context by the target processor, wherein the first translation table comprises a mapping of a first set of virtual addresses to a first set of physical addresses, whereby during execution of instructions generated based on the first set of directives, memory address translations are handled using the first translation table; determining a second translation table to be used in the second context by the target processor, wherein the second translation table comprises a mapping of a second set of virtual addresses to a second set of physical addresses, whereby during execution of instructions generated based on the second set of directives, memory address translations are handled using the second translation table, wherein the first translation table and the second translation table overlap.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
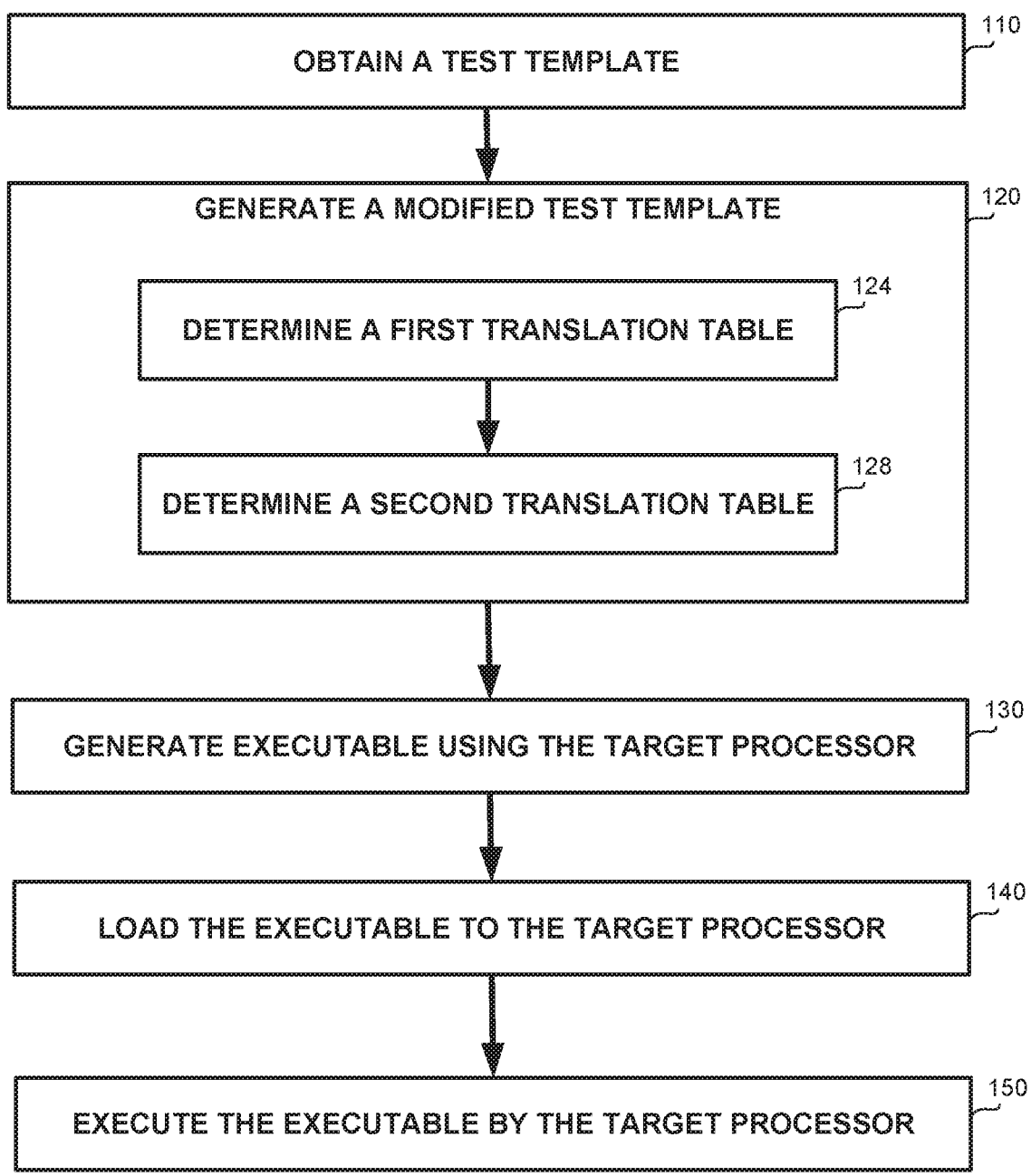
FIG. 1A shows a flowchart diagram of a method, in accordance with some exemplary embodiments of the disclosed subject matter.

One technical problem dealt with by the disclosed subject matter is to verify a target processor. The target processor may be a general-purposes processor, a Central Processing Unit (CPU), an Integrated Circuit (IC), or the like. More specifically, the technical problem may be to verify the target processor is exhibiting expected and correct behavior regarding context-switches and usages of the correct translation table when translating addresses.

In some exemplary embodiments, verifying a target processor may require simulation or execution of many test-cases, also referred to as tests. An engineer may define scenarios which should be verified. Each scenario may be illustrated using a test template. A test template may comprise directives providing the outline of the scenario to be tested. A plurality of alternative tests may be generated based on the same test template, each of which may be a different implementations of the scenario defined by the engineer. For example, the tests may differ in the actual instructions, operands, addresses, or the like. A test generator may generate the test based on the constraints defined by the test template. In some exemplary embodiments, a directive in the test template may define constraints, such as a type of instruction, constraint on the operands, constraint on the addresses used, or the like. A test generated based on the test template may be executed by the target processor, to determine whether the processor functions correctly. In some cases, the test may be executed using a simulator of the design of the target processor, such as in case the target processor is not yet fabricated. Additionally or alternatively, the test may be executed on the target processor itself.

In some exemplary embodiments, a context change may refer to a functionality of the target processor. The target processor may be configured to utilize different address translation tables in different contexts. For example, when attempting to access a virtual address in a first context, a first translation table is utilized to determine the corresponding physical address. However, if the same virtual address is accessed in a second context, the processor may be configured to utilize a second translation table to determine the correct physical address in that context.

In some exemplary embodiments, each context may be associated with a different translation table. The translation table may define a mapping of a set of virtual addresses to a set of physical addresses. During execution of a process, whenever a memory is accessed using a virtual address, the virtual address may be translated into physical address. The memory may be accessed as part of a memory access instruction, e.g., loading or storing information, as part of control flow operation, e.g., based on the instruction pointed to by the address that is stored in the program counter (also referred to as an instruction pointer). Context switching of the target processor may be the process in which the target processor changes the translation table that it utilizes for translating virtual addresses.

In some exemplary embodiments, different contexts may be utilized in a target processor having different processing entities, such as a multi-core processor, a processor having several hardware threads, a Simultaneous Multithreading (SMT) processor, or the like. Each processing entity may operate in a different context, and the target processor may be required to utilize the correct translation table in each context. As another example, a single processing entity may operate in different contexts intermittently. As an example, the single processing entity may execute instructions of two software processes, where for each process, a different time slice is allocated. The single processing entity of the target processor may be configured to pause the execution of one process and to start or resume another process. Switching from executing one process to executing another may comprise performing a context change.

In some exemplary embodiments, the disclosed subject matter may be utilized in pre-silicon verification. In pre-silicon verification, the target processor may not be available for operation, e.g., the target processor may not yet be fabricated. In some exemplary embodiments, instead of executing the target processor itself, a simulator, an emulator or the like may be utilized to simulate the operation of the design of the target processor. In some exemplary embodiments, a test generator may generate tests based on test templates and provide such tests to the simulator for execution. In some exemplary embodiments, the outcome of the simulated execution may be examined to determine whether the design provides the desired functionality.

In some exemplary embodiments, the disclosed subject matter may be utilized in post silicon verification. In some exemplary embodiments, post silicon verification may be performed with respect to a fabricated processor that is available. In some exemplary embodiments, during post silicon verification, an executable may be loaded to the target processor and used for testing the target processor. In some exemplary embodiments, the executable may cause the target processor to generate the tests, execute them and verify their outcome. In some exemplary embodiments, the executable may be generated off-device, such as by compiling and generating a binary that can be executed using the instruction set of the target processor.

Another technical problem dealt with by the disclosed subject matter is to accelerate the verification process while executing extensive and thorough tests. Additionally or alternatively, preparing an operating system for executing an executable may be a time consuming task. It may comprise validating permissions, loading the content of the executable to memory, copying command line arguments to the stack, creating a set of virtual addresses, determining a translation table, or the like. In some exemplary embodiments, it may be desired to test the operation of context changes of the target processor without loading thereon a full-fledged Operating System (OS).

One technical solution is to obtain a template and generate a modified test template. In some exemplary embodiments, the test template may comprise a first set of directives and a second set of directives. The first set of directives may be executed in a first context. Additionally or alternatively, the second set of directives may be executed in a second context. Additionally or alternatively, a first and a second translation tables may be determined. Each translation table may define a different mapping from a set of virtual addresses to a set physical address. Additionally or alternatively, each translation table may be utilized, respectively, in the first and second contexts, e.g. for memory access operations, for control flow operation, or the like. In some exemplary embodiments, the target processor may be configured to utilize a first translation table in order to perform memory access operations while executing instructions that are based on the first set of directives. Additionally or alternatively, the target processor may be configured to utilize the second translation table while executing instructions that are based on the second set of directives.

In some exemplary embodiments, the first translation table and the second translation table may overlap. In some exemplary embodiments, due to such overlapping, utilization of the wrong translation table may exhibit an identifiable operation that can be monitored. When such identifiable operation occurs, it may be determined that the target processor is exhibiting a bug. In some exemplary embodiments, the overlap may be in a virtual address, e.g., the first set of virtual addresses and the second set of virtual addresses may both comprise the same virtual address, which may be mapped to different physical addresses. Additionally or alternatively, the overlap may be in a physical address, e.g., the first set of physical addresses and the second set of physical addresses may both comprise a same physical address that is mapped to different virtual addresses.

In some exemplary embodiments, the first translation table may be a permutation of the second translation table. As an example, FIGS. 3B and 3C illustrates two mappings from an identical set of virtual address to an identical set of physical addresses, which are permutations of each other. The first mapping maps Set of Virtual Addresses 320, representing $VA_1$, $VA_2$, $VA_3$, $VA_4$, to Set of Physical Addresses 321, representing $PA_1$, $PA_4$, $PA_2$, $PA_3$. Put differently, $VA_1$ is mapped to $PA_1$, $VA_2$ is mapped to $PA_4$, $VA_3$ is mapped to $PA_2$, $VA_4$ is mapped to $PA_3$. This may also be denoted as $\{(VA_1, PA_1), (VA_2, PA_4), (VA_3, PA_2), (VA_4, PA_3)\}$. The second mapping maps the same Set of Virtual Addresses 320 to Set of Physical Addresses 322, which include the same physical addresses but in a different order. Specifically, as is exhibited in FIG. 3C, the second mapping is $\{(VA_1, PA_2), (VA_2, PA_1), (VA_3, PA_3), (VA_4, PA_4)\}$. As can be appreciated, each virtual address is mapped to a different physical address in the second mapping, and each physical address is likewise mapped to a different physical address in the second mapping.

In some exemplary embodiments, the modified test template may already take into account the different translation tables. In some exemplary embodiments, the modified test template may include directives relating to the translation tables, to utilization of addresses of the virtual translation tables, or the like. It is noted that in some embodiments the disclosed subject matter may be employed to generate tests directly without providing an intermediate, modifies test template. However, this is equivalent to modifying the test template and generating tests based thereon. Depending on how the tests are generated, different embodiments may be implemented. For example, in pre-silicon verification, tests may be generated directly from the test template, as the tests may be generated on the same platform that is tasked with modifying the test template to take into account context-related information. As another example, in post-silicon verification, the template may be modified off-platform and the modified template may be incorporated into the executable that is loaded onto the target processor. In yet another example, in post-silicon verification, the original template may be incorporated as is into the executable, and the executable may be, when executed by the target processor, generate the tests while taking into account context-related information.

In some exemplary embodiments, the designer of the test template may provide directives indicating information regarding the context. As an example, a number of contexts directive may be utilized to define a number of translation tables to be created and used. Additionally or alternatively, a size of translation table directive may be utilized to define a number of virtual addresses or a number of physical addresses to be included in each translation table, or the like.

In some exemplary embodiments, creation of test templates may be performed in advance, such as before loading an executable onto the target processor in post-silicon verification. The translation tables may then be utilized by tests implementing context change test scenario. In some exemplary embodiments, the disclosed subject matter provides for scenarios for efficiently verifying the Memory Management Unit (MMU) of the target processor using context change.

In some exemplary embodiments, the usage of the same array of virtual addresses that are mapped to a different set of physical addresses enables users to freely and quickly switch between contexts during test execution, and by that stress the MMU and its underlying micro-architecture structures.

One technical effect of utilizing the disclosed subject matter is to provide high-quality verification of a target processor. The disclosed subject matter may be utilized to ensure that context change operations performed by a target processor are tested. By utilizing an overlapping translation tables, bugs in context change performed by the target processor may be discovered.

In some exemplary embodiments, such verification may test the MMU of the target processor, the operation of the cache mechanism of the target processor, or the like. In some exemplary embodiments, the disclosed subject matter may be useful for testing and verifying correctness of the operation of the Translation Lookup Buffer (TLB) of the MMU of the target processor. In some exemplary embodiments, the TLB may be a cache that is used to reduce the time taken to access a user memory location, such as by caching recent address translation outcomes. In some exemplary embodiments, the TLB may store the recent translations of virtual memory to physical memory and may function as an address-translation cache. A TLB may reside between the CPU and the CPU cache, between CPU cache and the main memory or between the different levels of the multi-level cache. It is noted that TLB may be present in any processor that utilizes paged or segmented virtual memory.

Another technical effect of utilizing the disclosed subject matter is that the verification process of a context changing by the target processor may be faster and more efficient verification process. By utilizing the disclosed subject matter a small executable capable of executing a large number of tests may be used in order to verify a target processor. In some exemplary embodiments, tests generated based on tests templates in accordance with the disclosed subject matter may take advantage of the overlap between the translation tables to examine inconsistency in the operation of the target processor, and utilization of the wrong translation table at different contexts.

In some exemplary embodiments, translation tables may be prepared in advanced rather than in run time, enabling faster execution of tests and faster generation of tests. In that embodiment, the size of the image of the executable may be larger compared to a dynamic preparation of translation tables.

The disclosed subject matter may provide for one or more technical improvements over any pre-existing technique and any technique that has previously become routine or conventional in the art.

Additional technical problem, solution and effects may be apparent to a person of ordinary skill in the art in view of the present disclosure.

It is noted that the disclosed subject matter may be applicable with respect to any address translations. For example, in some processor architectures, the processor may utilize effective addresses, which may be translated into intermediate addresses, which in turn may be translated into real addresses. The disclosed subject matter may be utilized to verify correct translation of effective addresses to intermediate addresses, intermediate addresses to physical addresses, and effective addresses to physical addresses, e.g., such as in processors that implement Effective to Real Address Translation (ERAT). Without loss of generality and for the clarity of the present disclosure, the disclosed subject matter is described in relation to a virtual address that is mapped to a physical address. The virtual address may be any address that is utilized (directly or indirectly) in an instruction to the processor which is mapped to a physical address. The physical address may be any address that is utilized (directly or indirectly) by the processor to access memory.

Referring now to FIG. 1A showing a flowchart diagram of a method, in accordance with some exemplary embodiments of the disclosed subject matter.

On Step 110, a test template may be obtained. The test template may comprise a set of directives. In some exemplary embodiments, the test template may be defined by a verification engineer. The test template may define a scenario to be tested by the target processor. The test template may introduce one or more degrees of freedom for defining a concrete test that follows the scenario defined therein. In some exemplary embodiments, a directive may define constraints on the scenario. As an example, a directive may indicate that an instruction is to be created. The directive may indicate the type of instruction or may provide a set of types instructions from which the instruction is to be selected. The directive may indicate values, such as a constant value, a value defined on other values (e.g., defined using variables), a range of values from which the value is selected, or the like. In some exemplary embodiments, the directive may be configured to be processed by a test generator, which may generate tests that implement the scenario defined therein.

In some exemplary embodiments, a test template in accordance with the disclosed subject matter may define at least two portions of a test, each of which is to be executed in a different context. In each context, a different translation table may be utilized to translate virtual addresses to physical addresses.

In some exemplary embodiments, the set of directives may comprise a number of contexts directive. The number of contexts directive may define the number of translations tables that may be utilized for memory access. In some exemplary embodiments, the directive may indicate to the test generator, a number of tables to be defined, and at least some of which (or all of which) will be utilized during the execution of the test. Additionally or alternatively, the directive may indicate to a test template updating module to introduce into a modified test template the specific number of tables to be utilized by the generated tests, e.g., with concrete or symbolic values therein.

In some exemplary embodiments, the set of directives may comprise a size of translation table directive. The size of translation table directive may define the number of virtual addresses that may be included in translation table. Additionally or alternatively, the size of translation table directive may define the number of physical addresses to which the set virtual addresses is mapped to. In some exemplary embodiments, a first directive may define the number of physical addresses, while a second directive may define the number of virtual addresses. In some exemplary embodiments, the number of virtual addresses may be lower or equal to the number of physical addresses utilized. In some exemplary embodiments, the size of translation table directive may indicate to a test generator or to another component that allocates that translation tables, the size of each such translation table, the number of addresses to be utilized in such translation tables, the number of virtual addresses, the number of physical addresses, or the like.

In some exemplary embodiments, the size of translation table directive may indicate different sizes of translation tables, for different contexts. For example, if there the test template defines that there are four contexts, the size of each of the four translation tables may or may not be different, and explicitly defined using the size of translation table directive.

In some exemplary embodiments, the target processor that is to be tested using the test template may have a single thread architecture, may be configured to execute a single processing entity, or the like. Additionally or alternatively, the target processor may be configured to execute a plurality of processing entities. In some exemplary embodiments, the test template may be configured to implement a false sharing scenario, in which the same physical address is accessed, e.g., concurrently, by different processing entities, but to different portions thereof, such as each accessing a different offset from the same physical address. In some exemplary embodiments, each processing entity may access disjoint memory regions. As an example, a plurality of processing entities may each perform a scenario of repeatedly performing load/store operation and changing context, concurrently on the same set of physical addresses—each of which utilizing a different offset from the same base physical address. In such an embodiment, the same translation tables may be reused for different processing entities. For example, three different processing entities may use the same two translation tables to verify the operation of the MMU separately. The first processing entity may access the physical addresses with offset of zero (0), the second processing entity may access the physical addresses with an offset of 512, and the third processing entity may access the physical addresses with an offset of 1024. Assuming each access does not exceed 512 memory blocks, each processing entity may not interfere with the operation of the other. It is noted that in such an embodiment, a reduced number of translation tables is generated and the size of the modified test template may be, accordingly, relatively small, in comparison to the naïve solution utilizing six (6) different translation tables—2 for each processing entity. It is noted that in some embodiments, the same physical addresses may be reused regardless of whether or not the same virtual addresses are being used.

In some exemplary embodiments, the test template may be configured to implement true sharing test scenarios, such as a shared counter, sequential load consistency, or the like. Random context changes may be introduced and added into the test template to verify the operation of the MMU, without adversely affecting the effectiveness of the true sharing test scenario for discovering bugs, as the premise of the true sharing test scenarios may not be broken by such addition.

On Step 120, a modified test template may be generated. The modified test template may comprise additional directives, may replace existing directives, may remove directives, or the like. In some exemplary embodiments, the test template may indicate that multiple contexts are to be utilized, such as a first context and a second context. In one example, the test template may comprise a directive that is configured to cause a context change. Additionally, or alternatively, the test template may comprise a directive that is configured to cause execution of different portions thereof in different processing entities, and as a result, in potentially different contexts. Other scenarios may be implemented by the verification engineer defining the test template in order to verify the MMU, the usage of translation tables, or the like.

On Step 124, a first translation table may be determined. The first translation table may define a first mapping from a first set of virtual address to a first set of physical addresses. In some exemplary embodiments, the first translation table may be associated with a first context. In some exemplary embodiments, the first translation table may be embedded into the modified test template, to be utilized during the generation of tests based thereon. In some exemplary embodiments, the translation table may be external to the modified test template, and its values may be utilized by the generated tests. For the clarity of disclosure, and without limiting the disclosed subject matter to a specific embodiment, the disclosure herein refers to the table as being "embedded" in the modified test template, even if the table may be technically separate therefrom.

On Step 128, a second translation table may be determined. The second translation table may define a second mapping from a second set of virtual address to a second set of physical addresses. In some exemplary embodiments, the second translation table may be associated with a second context. In some exemplary embodiments, the second translation table may be embedded into the modified test template.

In some exemplary embodiments, a number of contexts directive may define a number of translation tables to be included in the modified test template. In case the number of translation tables is larger than two, additional translation tables may be determined. The sizes of the translation tables may be the size defined by a size of translation table directive.

In some exemplary embodiments, the first translation table and the second translation table may overlap. The first and second translation tables may overlap in the set of virtual address. At least one virtual address comprised by the first set of virtual addresses may be comprised by the second set of virtual addresses. Additionally, or alternatively, the first and second translation tables may overlap in the physical addresses. The first set of physical address may comprise a physical address. The physical address may be comprised by the second set of physical addresses.

In some exemplary embodiments, such overlapping may be useful for verifying the operation of the target processor, when performing context changes. Through the use of different translation tables, the same physical addresses may be accessible, such as using different virtual addresses, and vice versa. As an example, the target processor may be instructed, in a first context, to access a first virtual address that is mapped in the first context to a physical address. The target processor may then be instructed, in a second context, to access a second virtual address that is mapped in the second context to the same physical address. As the target processor should access the same physical address, the content in the accessed memory may be verified to be the same in both contexts. As yet another example, the target processor may be instructed, in a first context, to access a virtual address that is mapped in the first context to a first physical address. The target processor may then be instructed, in a second context, to access the same virtual address. As the same virtual address is mapped in the second context to a different physical address, it may be verified that a different content is accessed.

In some exemplary embodiments, the first set of virtual addresses and the second set virtual addresses may be identical. Each virtual address comprised by the first set of virtual addresses may be comprised by the second set of virtual addresses. Additionally or alternatively, each virtual address comprised by the second set of virtual addresses may be comprised by the first set of virtual addresses.

Additionally or alternatively, the first set of physical addresses and the second of virtual addresses may be identical. Each physical address comprised by the first set of physical addresses may be comprised by the second set of physical addresses. Additionally or alternatively, each physical address comprised by the second set of physical addresses may be comprised by the first set of physical addresses.

In some cases, in order to limit the number of addresses that are accessed during execution of a test—virtual or physical—the translation tables may be permutations of each other.

In some exemplary embodiments, a test may be generated based on a test template configured to test a false sharing scenario. The test may be configured to access a first offset of a physical address in a first context by utilizing a first translation table. Additionally or alternatively, the test may be configured to access a second offset of the physical address in a second address by utilizing a second translation table. In some exemplary embodiments, the first offset may be comprised by the first translation table and the second offset may be comprised by the second translation table.

On Step 130, an executable may be generated. The executable may be an exerciser program that is configured to be executed by the target processor, such as provided using the instruction set of the target processor. In some exemplary embodiments, the executable may include the modified test template. The executable may be configured, when executed to generate tests based on the modified test template, execute the test, and validate their outcome. In some exemplary embodiments, the executable may be utilized in for post-silicon verification, when the target processor is fabricated. Additionally or alternatively, the executable may be utilized in pre-silicon verification, such as by loading the executable onto an acceleration platform that is configured to provide the functionality of the target processor.

On Step 140, the executable may be loaded to the target processor. In some exemplary embodiments, the executable may be transferred from a storage in which it was originally generated, such as an off-platform computer, to the memory of the target processor, enabling the execution thereof by the target processor. The loading may be performed automatically, manually, semi-automatically, or the like.

On Step 150, the executable may be executed by the target processor. In some exemplary embodiments, the executable may be an exerciser configured to verify the target processor by generating tests that are inline with the test template, execute such tests and verify their outcome. In some exemplary embodiments, the generation may be performed using the modified test template, thereby utilizing previous computations, such as computations performed off-platform, using a reliable computing system, using cheaper and more available resources, or the like. In some exemplary embodiments, the exerciser may be configured to repeatedly generate a test, execute the generated test and validate its outcome.

In some exemplary embodiments, the validation may be based on an outcome of a test being different than the desired outcome of the test. In some exemplary embodiments, generating the test may comprise determining the desired outcome of the test. The outcome of a test may be an output value, occurrence or lack thereof of an event, such as a page fault, or the like.

Figure 1B:
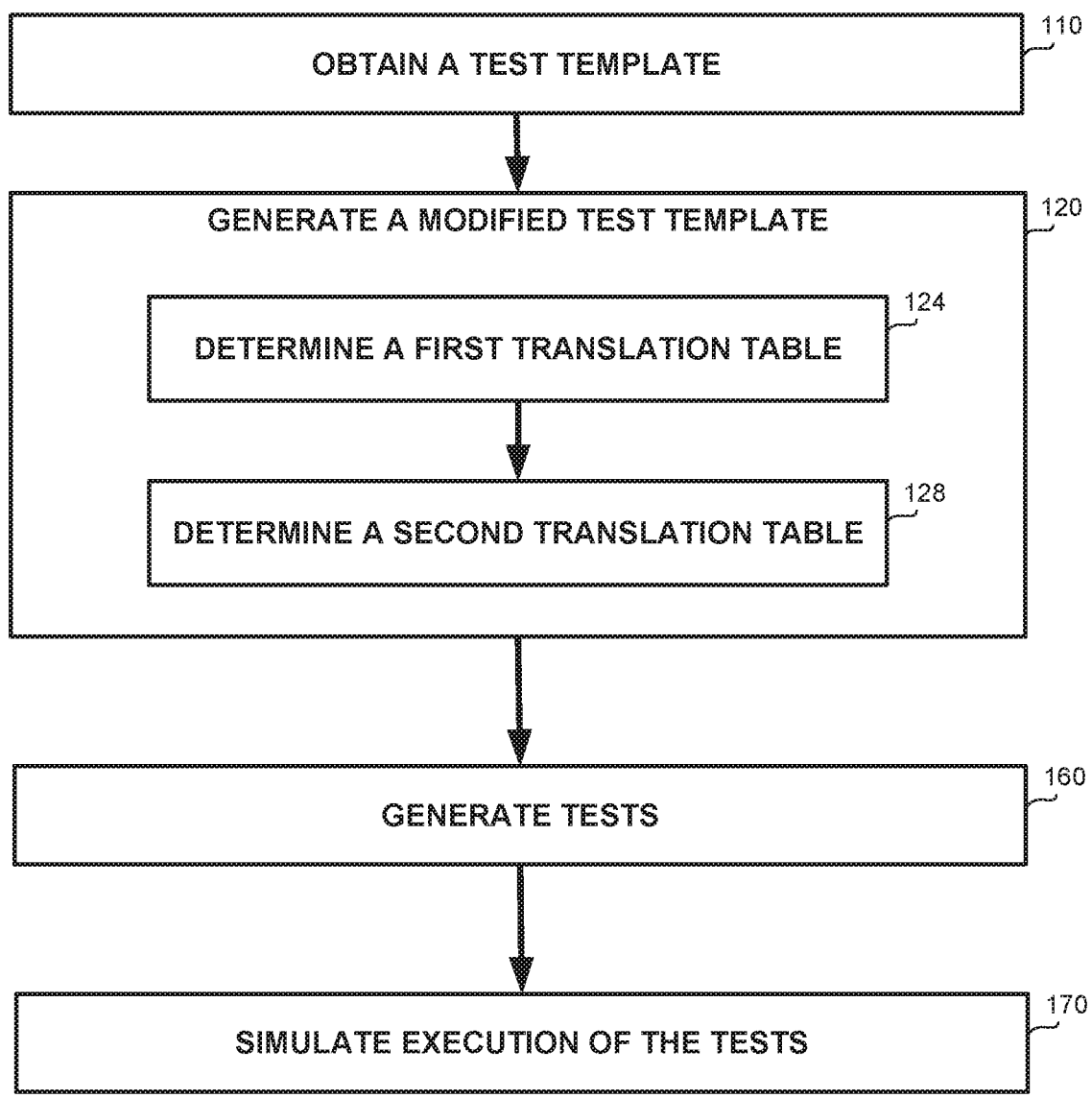
FIG. 1B shows a flowchart diagram of a method, in accordance with some exemplary embodiments of the disclosed subject matter.

Referring now to FIG. 1B showing a flowchart diagram of a method, in accordance with some exemplary embodiments of the disclosed subject matter.

FIG. 1B may illustrate utilizing the disclosed subject matter in a pre-silicon environment. In some exemplary embodiments, the pre-silicon environment may comprise a simulator, such as a Hardware Description Language (HDL) simulator, of the target processor, an emulation of the target processor, or the like.

On Step 160, tests may be generated based on the modified test template. In some exemplary embodiments, the generated tests may comprise a plurality of instructions based on directives comprised by the modified test template. In some exemplary embodiments, Step 160 may be performed by a device different than the target processor. It is noted that in some exemplary embodiments, Steps 120 and 160 may be combined and performed by a single module, such as a test generator.

The test generator may define a Constraint Satisfaction Problem (CSP) based on the set of constraints that are determined based on the directives of the modified test template. The CSP may define a set of variables, a set of constraints thereon, and a set of domain for each variables. The test generator may utilize a CSP solver to provide a solution to the CSP and utilize the solution to generate a test that complies with the directives of the test template. In some exemplary embodiments, a plurality of alternative solutions to the CSP may be provided, and accordingly, a plurality of alternative tests may be generated. It is noted that in some embodiments, the tests may be generated without the use of a CSP solver. In some exemplary embodiments, generating the simulation may comprise determining desired outcomes for each test. An outcome of a test may be an output value, occurrence or lack thereof of an event, adhering to an assertion, or the like.

On Step 170, an execution of the tests may be simulated. Simulating the tests may comprised executing each test on a computerized device simulating the target processor. The simulation may comprise simulating the functionality of the target processor's design, including the operation of the MMU, the utilization of the translation tables, the TBL, the cache mechanism, or the like. For each test, an outcome may be obtained.

It is noted that in some embodiments, Steps 160 and 170 may be performed repeatedly and iteratively, such as generating a test and simulating its execution.

In some exemplary embodiments, based on the simulation performed on Step 170, it may be determined if the target processor functions properly. Appropriate output indicating the results of the verification may be provided to a user, such as the verification engineer.

Figure 2:
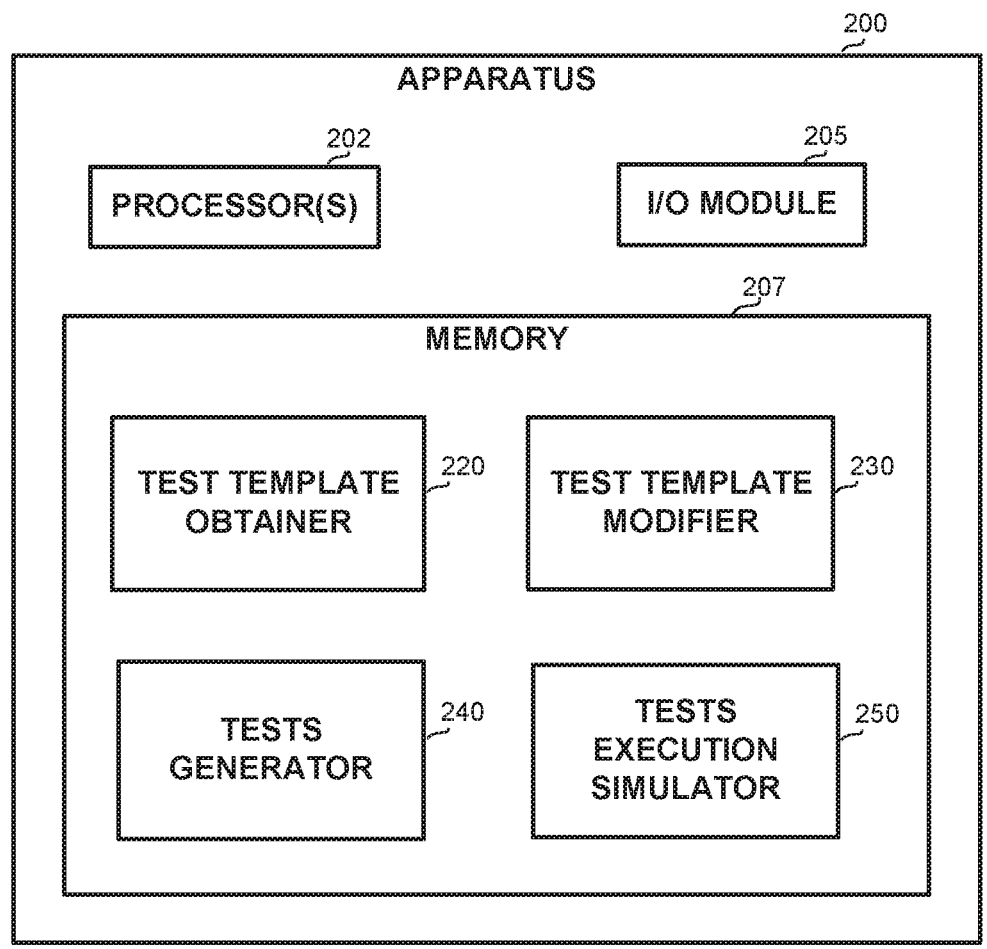
FIG. 2 shows a block diagram of an apparatus, in accordance with some exemplary embodiments of the disclosed subject matter.

Referring now to FIG. 2 showing a block diagram of an apparatus, in accordance with some exemplary embodiments of the disclosed subject matter. The apparatus of FIG. 2 may illustrate an apparatus of the disclosed subject matter in a pre-silicon environment.

In some exemplary embodiments, Apparatus 200 may comprise one or more Processor(s) 202. Processor 202 may be a Central Processing Unit (CPU), a microprocessor, an electronic circuit, an Integrated Circuit (IC) or the like. Processor 202 may be utilized to perform computations required by Apparatus 200 or any of its subcomponents.

In some exemplary embodiments, Processor 202 may be of a different model than the target processor, of a different brand than the target processor, have a different architecture than the target processor, or the like. Additionally, or alternatively, Processor 202 may be the target processor.

In some exemplary embodiments of the disclosed subject matter, Apparatus 200 may comprise an Input/Output (I/O) Module 205. I/O Module 205 may be utilized to provide an output to and receive input such as, for example obtain a test template from an external database, save outcomes of tests simulation to an external database, display results to a user, or the like.

In some exemplary embodiments, Apparatus 200 may comprise Memory 207. Memory 207 may be a hard disk drive, a Flash disk, a Random Access Memory (RAM), a memory chip, or the like. In some exemplary embodiments, Memory 207 may retain program code operative to cause Processor 202 to perform acts associated with any of the subcomponents of Apparatus 200. Memory 207 may comprise one or more components as detailed below, implemented as executables, libraries, static libraries, functions, or any other executable components.

In some exemplary embodiments, Test Template Obtainer 220 may be configured to obtain a test template. The test template may be similar to the test template that is obtained in FIG. 1A.

In some exemplary embodiments, Test Template Modifier 230 may be configured to modify a test template in accordance with the disclosed subject matter. It is noted, however, that in some embodiments, the template may need not be explicitly modified and a test may be generated based thereon directly. However, for the simplicity of disclosure, the embodiment is illustrated using a two-module implementation.

In some exemplary embodiments, Test Template Modifier 230 may be configured to obtain directives from the test template, such as a number of contexts directive, a size of translation table directive, or the like. In some exemplary embodiments, Test Template Modifier 230 may determine translation tables that meet the definitions provided using such directives. Additionally or alternatively, Test Template Modifier 230 may add into the modified test the translation tables, and enforce the template to utilize the translation tables in different contexts. As an example, a first translation table may be utilized when instructions that are generated based on a first set of directives are executed, while a second translation table may be utilized when instructions that are generated based on a second set of directives are executed.

In some exemplary embodiments, the modified test template may be retained in Memory 207. The modified test template may be provided to Test Generator 240 directly, without using an intermediate file.

In some exemplary embodiments, Tests Generator 240 may be configured to generate tests based on the modified test template as described in FIG. 1B, Step 160.

In some exemplary embodiments, Tests Execution Simulator 250 may be configured to simulate execution of tests by the target processor as described in FIG. 1B, Step 170.

Figure 3A:
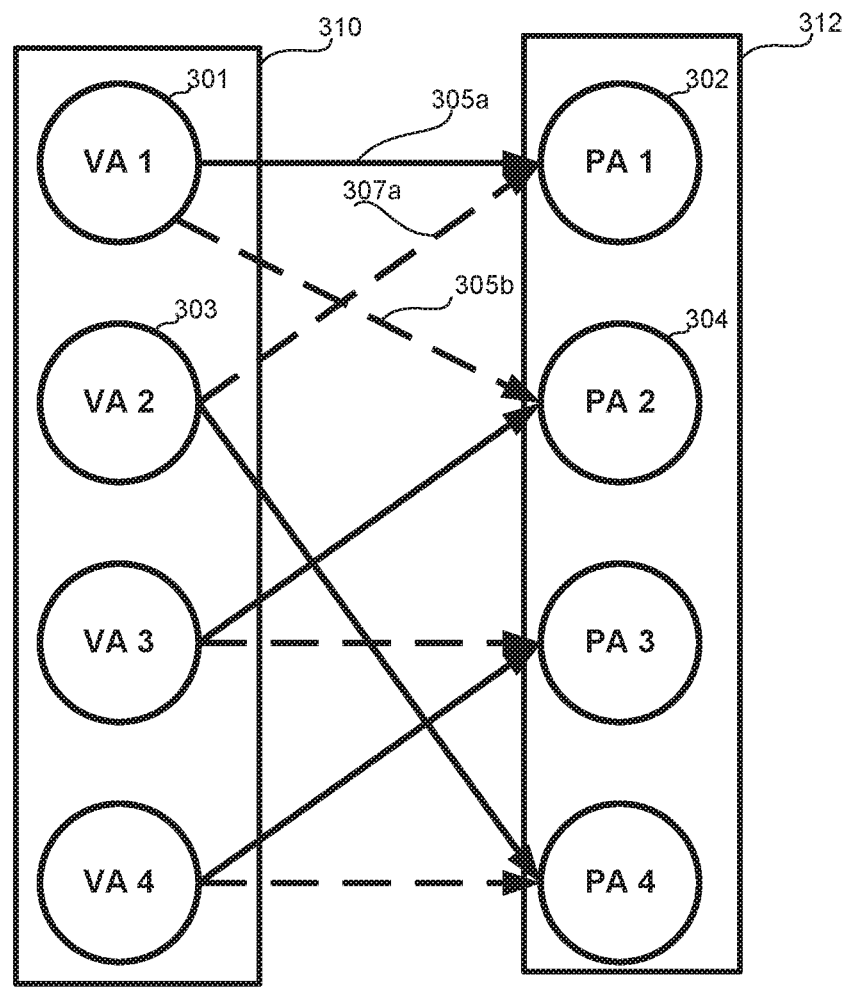
FIG. 3A illustrates two mappings from a set virtual addresses to a set of physical addresses, in accordance with some exemplary embodiments of the disclosed subject matter.
Figure 3B:
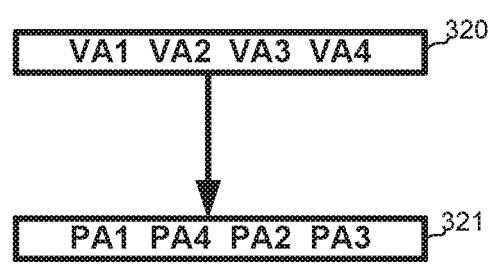
FIGS. 3B and 3C illustrate translation tables, in accordance with some exemplary embodiments of the disclosed subject matter.
Figure 3C:
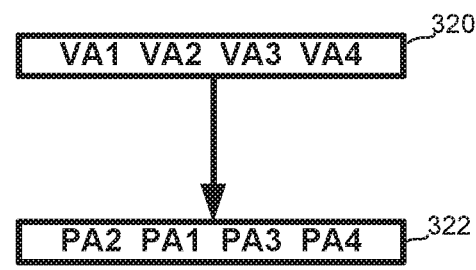

Referring now to FIG. 3A showing a schematic illustration of an exemplary mapping, in accordance with some exemplary embodiments of the disclosed subject matter.

FIG. 3A may illustrate two permutations of translation tables between identical sets of addresses: Virtual Addresses Set 310 and Physical Addresses Set 312. A first translation table is illustrated using full arrows (e.g., 305*a*), while a second translation table is illustrated by broken arrows (e.g., 305*b*). The first translation table may Virtual Address 301 (VA1) to Physical Address 302 (PA1) (e.g., as illustrated by Arrow 305*a*). The same translation table also maps Virtual Address 303 (VA2) to Physical Address 304 (PA4). However, the second translation table maps Virtual Address 301 (VA1) to Physical Address 304 (PA2) (e.g., as illustrated by Arrow 305*b*) and Virtual Address 303 (VA2) to Physical Address 302 (PA1) (e.g., as illustrated by Arrow 307*a*).

As can be appreciated, although both translation tables shared the same sets of virtual and physical addresses, each virtual address is mapped to a different physical address in each translation table, and each physical address is likewise mapped to a different virtual address in each translation table. FIGS. 3B and 3C illustrate in a separate manner the first and second translation tables that are a permutation of each other.

It may be noted that in some exemplary embodiments, the translation tables may overlap but not be a permutation of each other. Additionally or alternatively, other relations, beside a permutation, may exists between the translation tables.

Figure 4:
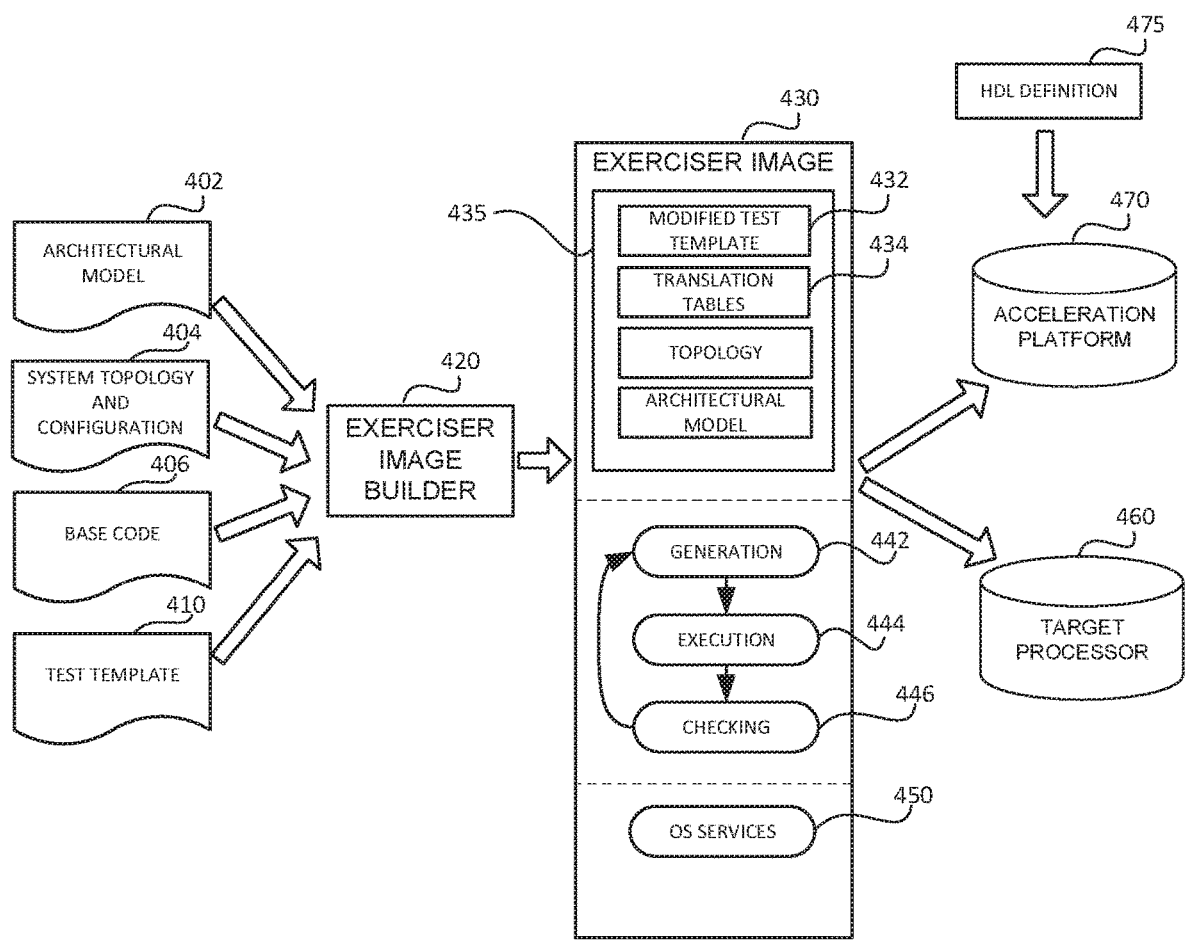
FIG. 4 shows a schematic illustration of an exemplary environment and architecture in which the disclosed subject matter may be utilized, in accordance with some exemplary embodiments of the disclosed subject matter.

Referring now to FIG. 4, showing an illustration of a computerized environments in accordance with some exemplary embodiments of the disclosed subject matter. FIG. 4 may illustrate a post-silicon verification scenario.

An Exerciser Image Builder 420 may be configured to generate an Exerciser Image 430. Exerciser Image Builder 420 may be a computerized tool, such as implemented in hardware, software, a combination thereof, or the like. Exerciser Image Builder 420 may be configured to take different inputs as data which based thereon Exerciser Image 420 may be built.

In some exemplary embodiments, Architectural Model 402 may be provided as input, and portions thereof may be inserted to a Data Section 435 of Exerciser Image 430. Architectural model 402 may be utilized by Exerciser Image 420 to generate test cases that invoke different architectural aspects of the target device. Additionally or alternatively, System Topology and Configuration 404 may be provided as input and portions thereof may be retained in Data Section 435. Topology and configuration information may be utilized by Exerciser Image 430 to generate test cases that test different aspects of the topology and configuration of the target device. Additionally or alternatively, Base Code 406 may be provided as input. Base Code 406 may comprise program instructions to be added to Exerciser Image 430. In some exemplary embodiments, Exerciser Image 430 may be based on Base Code 406. The program instructions may be operative to perform generation-execution-checking loop (442, 444, 446). Additionally or alternatively, Base Code 406 may comprise program instruction providing OS services, such as OS Services 450. Additionally or alternatively, Test Template 410 or a plurality of similar templates may be provided as input and may be retained in Data Section 435 to allow Exerciser Image 430 to perform generation based upon abstract outline of operations provided by the Test Template 410. In some exemplary embodiments, Test Template 410 may be modified and a Modified Test Template 432 may be included in Data Section 435.

In some exemplary embodiments, Exerciser Image Builder 420 may be configured to manipulate any input provided to it before storing corresponding data in Data Section 435. In one embodiment, Exerciser Image Builder 430 may strip down information that is not needed by the Exerciser Image 420 and/or may pre-calculate information to reduce amount of data to be retained in the binary image.

In some exemplary embodiments, Exerciser Image Builder 420 may pre-calculate Translation Tables 434, such as based on directives in Test Template 410.

In some exemplary embodiments, Exerciser Image 430 may comprise Data Section 435 that may retain useful information such as test template based upon generation may be performed (e.g., 410 or 432), Translation Tables 434, topology and configuration information, architectural model information or the like.

In some exemplary embodiments, Exerciser Image 430 may comprise program instructions designed to cause the Target Processor 460 to repeatedly perform generation of a test case (442), execution of the test case (444) and checking results of executing the test case (446). Checking operations (446) may be based on consistency checks. As an example, the same test case may be executed a plurality of times, and the results may be compared for consistency.

Exerciser Image 430 may comprise OS Services 450, an Additional Software Layer (ASL), useful for providing the Exerciser Image 430 with functionality that is not provided by a bare-metal product, such as Target Processor 460. OS Services 450 may provide functionalities such as interrupt handlers, program counter or instruction pointer manipulation, software-based context switch, or the like.

Exerciser Image 430 may be loaded onto a platform, such as Target Processor 460. Exerciser Image 430 may be loaded by loading the binary to a memory unit of Target Processor 460. Exerciser Image 430 may be executed by the Target Processor 460 and may cause Target Processor 460 to generate tests, execute and check their execution results, thereby enabling verification of the Target Processor 460.

Exerciser Image 430 may be alternatively loaded to an Acceleration Platform 470 which simulates, in a hardware-based manner, Target Processor 460. Acceleration Platform 470 may be configured to simulate operation of a circuit design based upon an HDL definition thereof (475), such as the HDL from which Target Processor 460 is fabricated.

An Embodiment

In some exemplary embodiments, a single shared physical address may be utilized to verify operation of a target processor. In a first translation table, a first virtual address is mapped to a physical address and a second virtual address is not mapped, and as a result, if accessed, a page fault will occur. In a second translation table, the second virtual address is mapped to the physical address, while the first virtual address is not mapped. This can be illustrated using the following formula:

$$\binom{VA_1}{VA_2} \xrightarrow[ctxt.1]{} \binom{PA_1}{\text{page fault}}, \binom{VA_1}{VA_2} \xrightarrow[ctxt.2]{} \binom{\text{page fault}}{PA_1}$$

A test template may be configured to change contexts and attempt accessing the same PA in different contexts to ensure that the correct translation tables are used. For example, VA1 may be accessed in the first context and VA2 may be accessed in the second context, e.g., for storing, loading, or the like. If a page fault occurs, it may be indicative of a bug in the MMU, as the address was incorrectly translated.

An Embodiment

A data-side scenario may be utilized to test memory access operations of the target processor. The test template may define that two contexts are to be used (e.g., using a context number directive), and that each translation table comprises four virtual addresses (e.g., using a size of translation table directive) and four physical addresses (e.g., using a second size of translation table directive). The test template may define a scenario where, repeatedly, a memory access instruction is performed and a context is changed. The modified test template may be defined using the following directives:

VA_x=Rand(VA1,VA2,VA3,VA4)
Load/Store myOffset (VA_x)
Context change
Load/Store myOffset (VA_x)
Context change
Load/Store myOffset (VA_x)

As can be appreciated, the test template indicates that the VA_x variable is randomly selected when a test is generated, as one of VA1, VA2, VA3, VA4, which are the four virtual addresses used by both translation tables that were determined for the modified test template.

The generated test may include instructions that perform the scenario of performing a memory access operation (e.g., load instruction, or store instruction) that access the selected virtual address (VA_x), and changing the context. The access may be performed in any offset from the base address of VA_x. In some exemplary embodiments, myOffset function may define a constraint on the offset, such as providing a different offset for different processing entities thereby enabling utilization of false sharing to verify the different processing entities using the same translation tables. It is noted that in each context the physical address of VA_x is different, due to the usage of the different translation tables that share the value of VA_x but map it to a different physical address.

An Embodiment

An instruction-side scenario may be utilized to test control flow operation of the target processor. The test template may define that two contexts are to be used (e.g., using a context number directive), and that each translation table comprises four virtual addresses (e.g., using a size of translation table directive) and four physical addresses (e.g., using a second size of translation table directive). The test template may define a scenario where instructions are loaded into the physical addresses pointed to be the virtual address, and are executed due to a branching instruction that is performed to the virtual address. A first set of instructions may be located starting at the physical address that the first mapping points to. These instructions may comprise an instruction causing a context change, that is followed by an instruction that indicates an error, if executed. After the context changes, and as the program counter is not modified and the value thereof is based on an offset from the virtual address, an instruction located at the appropriate offset from a different physical address, the physical address that the same virtual address is mapped to by the second mapping, may be executed. In case of a bug in the target processor, instead of executing the correct instruction, the instruction that indicates the error may be executed.

As an example, the modified test template may be defined using the following directives:

VA_x=Rand(VA1,VA2,VA3,VA4)

Store in VA_x of a first context, instructions:
 Non-PC-affecting instruction
 Context change to a second context
 Assert (false)
Store in an offset of three instructions from VA_x of the second context,
 Random instruction
Branch to VA_x As can be appreciated, a test in accordance with such test template branches, in a first context, to a randomly selected virtual address, and executes two instructions that are located in such location—a random instruction that does not affect the program counter (non-PC-affecting instruction), and an instruction to change the context. If the MMU operates correctly, following the context change, the "assert (false)" instruction is not executed, but rather the random instruction.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   obtaining a test template, wherein the test template is utilized for testing a target processor, wherein the test template comprises one or more directives, at least one of which represents a plurality of alternative sets of one or more instructions executable by the target processor, wherein the target processor is configured to utilize a different translation table to translate a virtual address to a physical address in different contexts, wherein the test template comprises:
   a first set of directives to be executed in a first context;
   a second set of directives to be executed in a second context;

based on the test template, generating a modified test template, wherein said generating comprises:
  determining a first translation table to be used in the first context by the target processor, wherein the first translation table comprises a mapping of a first set of virtual addresses to a first set of physical addresses, whereby during execution of instructions generated based on the first set of directives, memory address translations are handled using the first translation table;
  determining a second translation table to be used in the second context by the target processor, wherein the second translation table comprises a mapping of a second set of virtual addresses to a second set of physical addresses, whereby during execution of instructions generated based on the second set of directives, memory address translations are handled using the second translation table, wherein the first translation table and the second translation table overlap.

2. The method of claim 1, wherein the first translation table and the second translation table overlap in the sets of virtual addresses, wherein the first set of virtual addresses comprises at least one virtual address, wherein the second set of virtual addresses comprises the at least one virtual address.

3. The method of claim 1, wherein the first translation table and the second translation table overlap in the sets of physical addresses, wherein the first set of physical addresses comprises at least one physical address, wherein the second set of physical addresses comprises the at least one physical address.

4. The method of claim 1, wherein the first set of virtual addresses and the second set of virtual addresses are identical, wherein the first set of physical addresses and the second set of physical addresses are identical, wherein for each virtual address of the first set of virtual addresses, the mapping of the first translation table provides a different physical address than the mapping of the second translation table.

5. The method of claim 1, wherein the one or more directives of the test template comprise:
  a number of contexts directive, wherein the number of contexts directive defines a number of translation tables to be utilized during execution of a test in accordance with the test template, wherein each translation table is associated with a different context; and
  a size of translation table directive, wherein the size of translation table directive defines a number of virtual addresses or a number of physical addresses to be included in each translation table.

6. The method of claim 1,
wherein the overlap between the first translation table and the second translation table is in a physical address, whereby the physical address is comprised by both the first set of physical addresses and the second set of physical addresses; and
wherein a test generated based on the modified test template is configured to access a first offset from the physical address in the first context and to access a second offset from the physical address in the second context, whereby the test testing a false sharing scenario between two disjoint memory ranges.

7. The method of claim 1,
wherein during execution of instructions generated based on the first set of directives, the target processor is configured to perform a first memory access operation based on the first translation table; and
wherein during execution of instructions generated based on the second set of directives, the target processor is configured to perform a second memory access operation based on the second translation table; and
wherein each of the first memory access operation and the second memory access operation is one of a memory load operation and a memory store operation;
whereby a test generated based on the modified test template is configured to test utilization of translation tables in memory access operations.

8. The method of claim 1,
wherein the overlap between the first translation table and the second translation table is in a virtual address;
wherein during execution of instructions generated based on the first set of directives:
  the target processor is configured to perform a branching instruction to the virtual address, whereby causing a program counter to be assigned the virtual address; and
  the target processor is configured to perform a context change while the program counter is assigned a value that is defined based on an offset from the virtual address, whereby causing execution of instructions generated based on the second set of directives;
wherein during execution of the instructions generated based on the second set of directives, a value of the program counter is based on the offset from the virtual address;
whereby a test generated based on the modified test template is configured to test utilization of translation tables in control flow operation of the target processor.

9. The method of claim 1 further comprises:
generating tests based on the test template; and
simulating an execution of the generated tests using a simulator configured to simulate operation of the target processor.

10. The method of claim 1 further comprises:
generating an executable that is configured to be executed on the target processor, wherein the executable is configured to generate tests based on the modified test template, execute the tests and determine desired outcomes of the tests;
loading the executable to the target processor; and
executing the executable by the target processor, whereby the tests are generated and executed.

11. A computer program product comprising a non-transitory computer readable storage medium retaining program instructions, which program instructions when read by a processor, cause the processor to perform:
obtaining a test template, wherein the test template is utilized for testing a target processor, wherein the test template comprises one or more directives, at least one of which represents a plurality of alternative sets of one or more instructions executable by the target processor, wherein the target processor is configured to utilize a different translation table to translate a virtual address to a physical address in different contexts, wherein the test template comprises:
  a first set of directives to be executed in a first context;
  a second set of directives to be executed in a second context;
based on the test template, generating a modified test template, wherein said generating comprises:
  determining a first translation table to be used in the first context by the target processor, wherein the first translation table comprises a mapping of a first set of virtual addresses to a first set of physical addresses, whereby during execution of instructions generated based on the first set of directives, memory address translations are handled using the first translation table;

determining a second translation table to be used in the second context by the target processor, wherein the second translation table comprises a mapping of a second set of virtual addresses to a second set of physical addresses, whereby during execution of instructions generated based on the second set of directives, memory address translations are handled using the second translation table, wherein the first translation table and the second translation table overlap.

12. The computer program product of claim 11, wherein the first translation table and the second translation table overlap in the sets of virtual addresses, wherein the first set of virtual addresses comprises at least one virtual address, wherein the second set of virtual addresses comprises the at least one virtual address.

13. The computer program product of claim 11, wherein the first translation table and the second translation table overlap in the sets of physical addresses, wherein the first set of physical addresses comprises at least one physical address, wherein the second set of physical addresses comprises the at least one physical address.

14. The computer program product of claim 11, wherein the first set of virtual addresses and the second set of virtual addresses are identical, wherein the first set of physical addresses and the second set of physical addresses are identical, wherein for each virtual address of the first set of virtual addresses, the mapping of the first translation table provides a different physical address than the mapping of the second translation table.

15. The computer program product of claim 11, wherein the one or more directives of the test template comprise:
a number of contexts directive, wherein the number of contexts directive defines a number of translation tables to be utilized during execution of a test in accordance with the test template, wherein each translation table is associated with a different context; and
a size of translation table directive, wherein the size of translation table directive defines a number of virtual addresses or a number of physical addresses to be included in each translation table.

16. The computer program product of claim 11,
wherein the overlap between the first translation table and the second translation table is in a physical address, whereby the physical address is comprised by both the first set of physical addresses and the second set of physical addresses; and
wherein a test generated based on the modified test template is configured to access a first offset from the physical address in the first context and to access a second offset from the physical address in the second context, whereby the test testing a false sharing scenario between two disjoint memory ranges.

17. The computer program product of claim 11,
wherein during execution of instructions generated based on the first set of directives, the target processor is configured to perform a first memory access operation based on the first translation table; and
wherein during execution of instructions generated based on the second set of directives, the target processor is configured to perform a second memory access operation based on the second translation table; and
wherein each of the first memory access operation and the second memory access operation is one of a memory load operation and a memory store operation;
whereby a test generated based on the modified test template is configured to test utilization of translation tables in memory access operations.

18. The computer program product of claim 11,
wherein the overlap between the first translation table and the second translation table is in a virtual address;
wherein during execution of instructions generated based on the first set of directives:
the target processor is configured to perform a branching instruction to the virtual address, whereby causing a program counter to be assigned the virtual address; and
the target processor is configured to perform a context change while the program counter is assigned a value that is defined based on an offset from the virtual address, whereby causing execution of instructions generated based on the second set of directives;
wherein during execution of the instructions generated based on the second set of directives, a value of the program counter is based on the offset from the virtual address;
whereby a test generated based on the modified test template is configured to test utilization of translation tables in control flow operation of the target processor.

19. The computer program product of claim 11 further comprises:
generating an executable that is configured to be executed on the target processor, wherein the executable is configured to generate tests based on the modified test template, execute the tests and determine desired outcomes of the tests;
loading the executable to the target processor; and
executing the executable by the target processor, whereby the tests are generated and executed.

20. A target processor that is adapted to perform the steps of:
obtaining a test template, wherein the test template is utilized for testing the target processor, wherein the test template comprises one or more directives, at least one of which represents a plurality of alternative sets of one or more instructions executable by the target processor, wherein the target processor is configured to utilize a different translation table to translate a virtual address to a physical address in different contexts, wherein the test template comprises:
a first set of directives to be executed in a first context;
a second set of directives to be executed in a second context;
based on the test template, generating a modified test template, wherein said generating comprises:
determining a first translation table to be used in the first context by the target processor, wherein the first translation table comprises a mapping of a first set of virtual addresses to a first set of physical addresses, whereby during execution of instructions generated based on the first set of directives, memory address translations are handled using the first translation table;
determining a second translation table to be used in the second context by the target processor, wherein the second translation table comprises a mapping of a second set of virtual addresses to a second set of physical addresses, whereby during execution of instructions generated based on the second set of directives, memory address translations are handled using the second translation table, wherein the first translation table and the second translation table overlap.

* * * * *